Oct. 4, 1932.    G. DALKOWITZ    1,880,848
HOLDER FOR BLADE PROCESSING
Filed Aug. 20, 1926    2 Sheets-Sheet 1
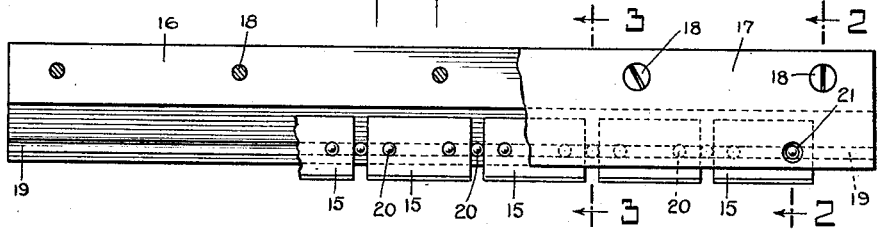
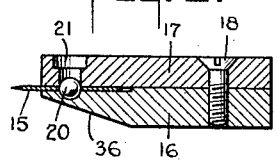
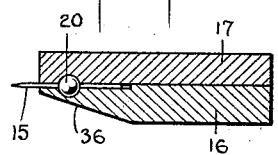
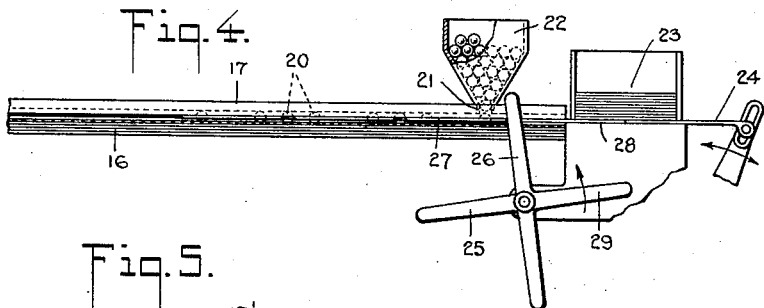
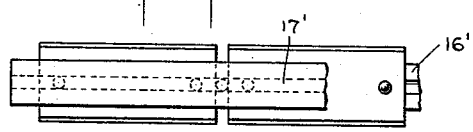
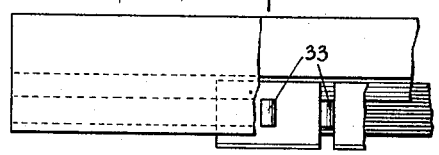
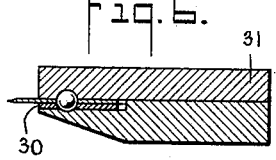
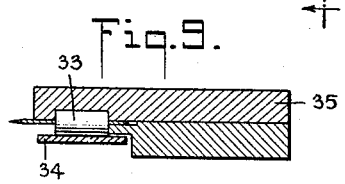
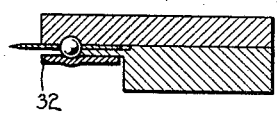
INVENTOR
Godfrey Dalkowitz
BY
William S. Gluck
ATTORNEY Oct. 4, 1932.  G. DALKOWITZ  1,880,848
HOLDER FOR BLADE PROCESSING
Filed Aug. 20, 1926  2 Sheets-Sheet 2
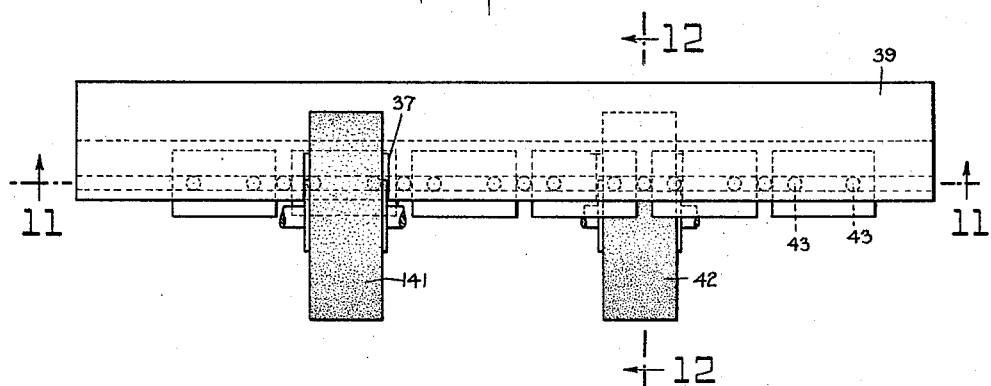
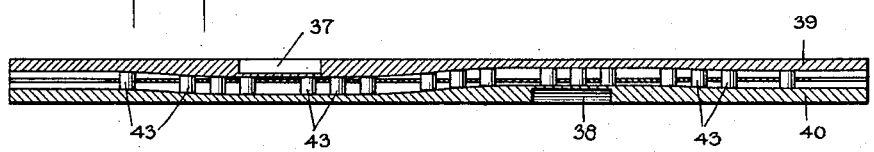
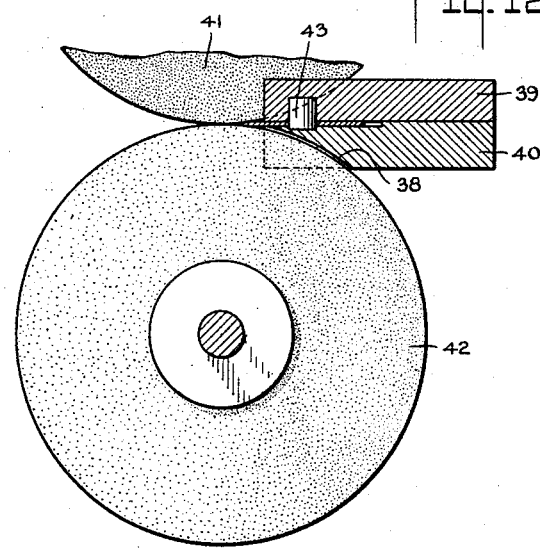
INVENTOR
BY
ATTORNEY Patented Oct. 4, 1932

1,880,848

UNITED STATES PATENT OFFICE

GODFREY DALKOWITZ, OF NEW YORK, N. Y., ASSIGNOR TO THE AMERICAN SAFETY RAZOR CORPORATION, OF BROOKLYN, NEW YORK, A CORPORATION OF VIRGINIA

HOLDER FOR BLADE PROCESSING

Application filed August 20, 1926. Serial No. 130,431.

My present invention relates to the manufacture of blades, and has particular reference to an apparatus to be employed during the treatment of steel during the manufacture of blades of the safety razor type.

For the purposes of grinding, honing, stropping, or otherwise treating sheet steel, whether the latter be in the form of a continuous uncut strip or in the form of separate blade blanks, it is desirable to provide means for guiding the strip or blanks which are to be worked upon into successive positions with respect to the necessary operating instrumentalities. It is an object of the present invention to provide a device of this character, and more particularly, it is an object to provide an apparatus which will enable the strip or blanks to be suitably engaged and guided for the purposes specified.

The nature of the strip or blanks which are to be treated for the purpose of turning out a finished blade or blades is such that the problem of suitably gripping, moving, and guiding the strip or blanks is beset with numerous obstacles. The edge of the strip, or the edges of the separate blanks, must be accurately guided into operative positions with respect to the grinding wheels and other instrumentalities in order that the latter may fulfill their functions in an efficient manner. The movement of the steel in such an accurate manner, and particularly in cases where separate blanks have already been cut, is rendered difficult by the extreme thinness of the steel and the consequent problem of gripping the blanks while at the same time moving them in an accurately guided manner.

It is an object of the present invention to provide a device which will achieve these functions in an efficient and simple manner, regardless of whether the steel is in strip form, whether the blanks have already been cut, or whether the blades are to be single or double edged.

It is another object of the invention to provide a device wherein the gripping, moving, and guiding of the steel may be rendered entirely automatic, the device being totally devoided of complicated parts or mechanism which might impair the efficient operation or render the manufacture of the device and the process of treatment unduly expensive.

An important feature of the present invention lies in providing means for permitting the utilization of a plurality of free guiding elements, said elements being free not only with respect to the device, but also with respect to each other, whereby they may be freely associated and disassociated with the device and thereby reused with great facility.

Another feature of my invention lies in providing means for preventing any impairment of operation due to the "riding" of successive blades or blanks upon each other during their movement.

The invention contemplates the provision of guiding elements in the form of rollers, such as balls or cylinders. These rollers are positionable not only in association with the blade strips, but also between the strips so as to act as spacers, where a plurality of strips are used. In one embodiment, the movement of the strips may be effected by actuating one thereof and permitting the spacers to transmit the movement to the others. In other embodiments, movement may be imparted directly to the spacing or guiding elements, whereby their association with the blade strips will cause guided movement of the latter.

Briefly, my invention contemplates the provision of a holder wherein a guideway is provided and wherein a strip of steel, or a series of blades, may be movably received; and wherein means constrained to move in said guideway are so engaged as to move strip and blades, thereby permitting a predetermined guided movement of the strip or blades to be effected. My invention is particularly applicable to the treatment of cut blanks having openings provided therein, and in such a case, the guide elements are of a character to engage within these openings, and also between the blanks, to effect the desired guidance.

In one embodiment of my invention, the guiding means are provided in the form of elements which are adjustable as by cams or cam surfaces, during the movement of the blanks; this adjustment being effected for the purpose of withdrawing these guide elements from the proximity of instrumentalities such as grinding wheels.

For the attainment of the foregoing objects and such other objects as may hereinafter appear or be pointed out, I have illustrated embodiments of my invention in the accompanying drawings in which—

Fig. 1 is a plan view of one embodiment of my invention wherein a series of cut blanks are shown suitably arranged for presentation to successive treatment instrumentalities. Parts of this figure are broken away to disclose otherwise hidden parts;

Fig. 2 is a cross-section taken along the line 2—2 of Fig. 1;

Fig. 3 is a cross-sectional view taken along the line 3—3 of Fig. 1;

Fig. 4 is a front elevational view of the device shown in Fig. 1, showing for illustrative purposes possible operating accessories;

Fig. 5 is a fragmentary view similar to Fig. 1, showing a modification;

Fig. 6 is a view similar to Fig. 3 showing a modification;

Fig. 7 is a view similar to Fig. 6 showing a further modification;

Fig. 8 is a fragmentary view similar to Fig. 1, showing a modification;

Fig. 9 is a cross-sectional view taken along the line 9—9 of Fig. 8;

Fig. 10 is a view similar to Fig. 1 showing a modification;

Fig. 11 is a cross-sectional view taken along the line 11—11 of Fig. 10; and

Fig. 12 is a cross-section along the line 12—12 of Fig. 10.

Referring now to the drawings, and particularly to Figs. 1–4, it will be observed that I have shown a series of cut blanks 15 positioned in spaced successive relationship within a blade receiving channel of a supporting structure. This supporting structure may comprise superposed strips or castings 16 and 17, suitably attached to each other, as by screws or bolts 18, and one or both thereof having its inner face so shaped as to provide a blade receiving channel when the elements 16 and 17 are associated with each other. In the illustrated embodiment, I have shown the element 16 provided with a stepped portion which causes this blade receiving channel to be formed, the surface of this stepped portion constituting one wall of the channel, and the inner surface of the element 17 constituting the other wall thereof.

Associated with this channel is a suitable guideway for the reception of guiding means. I have illustratively shown a groove or runway 19 formed by providing a substantially semi-circular groove in each of the opposite walls of the channel. This guideway is particularly adapted for the employment therein of guide means in the form of balls 20 suitably sized to move snugly therein. Adjacent to one end of the supporting device is an opening communicating with the guideway 19 through which balls may be fed as required. I have shown the element 17 provided with an opening 21 of this character, and in Fig. 4 I have illustratively shown a hopper 22 which may be fixedly associated with this opening so as to permit the feeding of one ball at a time through the opening and into the guideway 19.

The blade receiving channel is made of a width suitable to accommodate the blanks 15 snugly therein. These blades are shown as provided with a pair of circular openings. These openings may be the same openings which will eventually be employed during the association of the blade with a razor; or the openings may be specially prepared for the purposes herein specified. These openings are of a size to accommodate one of the balls 21, and it is contemplated to position one ball in each of these openings and also to position one ball between each blank.

This arrangement of the balls is clearly shown in Fig. 1, and it will now be understood that movement imparted to the end blank of the series will be transmitted, by virtue of the spacing balls, through the entire series. Furthermore, it will be readily understood that the constrainment of the balls to move within the guideway 19 will cause the blanks to be suitably guided accordingly. Thus, if the guideway 19 is straight, and the supporting device is suitably positioned at a predetermined point with respect to the grinding wheels and similar instrumentalities which the blades are to encounter, the blades will be caused to move accurately into successive positions with respect to each instrumentality.

I have illustratively shown driving means and feeding means in Fig. 4 wherein a stock or supply of blade blanks 23 is arranged to be operated upon by a feeding arm 24. This arm is of a character to engage the rear end of the bottom blank of the pile, push this blank into the blade receiving channel through an end of the channel, and then return to its original withdrawn position in readiness for engaging the next blank. In other words, the arm 24 may be made to reciprocate so as to feed one blank at a time into one end of the blade receiving channel.

Acting in timed relation with the arm 24 is a motivating wheel or element 25 which may be made to rotate constantly in one direction, (indicated by the arrow), and which may be provided with radiating arms adapted to engage the rear end of each blank as the latter is pushed into the channel by the arm 24. For example, referring particularly to Fig. 4, I have shown an arm 26 of the wheel 25 in the act of pushing forward a blank 27. At the same time, I have shown the arm 24 pushing forward, from beneath the pile 23, a blank 28. When the blank 28 has been properly positioned so that its rear end will be engaged by the arm 29, the reciprocating member 24 will withdraw, leaving the other arm 29 to continue the forward movement of the blank 28. In the meantime, the arm 26 will have released its engagement with the rear of the blank 27, a ball will have been fed from the hopper 22 into the space between the blank 27 and the blank 28, and when the arm 29 engages the rear edge of the blank 28, this arm will temporarily effect the forward movement of the entire series of blanks. In a similar manner, the balance of the blanks will be fed into the channel, and as each blank passes beneath the hopper 22, a ball will be fed into each of the openings therein, and a ball will also be fed into the space between successive blanks.

At the opposite end of the guiding device, the blades may be removed in succession by a suitable device (not shown), and the balls may be caused to drop into a collecting device (not shown) from which they may eventually be fed back into the hopper 22. During the passage of the blades from one end of the guiding device to the other, they will be accurately guided so that their respective positions with respect operating instrumentalities will be absolutely correct in accordance with predetermined design. The provision of the balls within the blade openings will prevent each individual blade from twisting and will cause the blade to be efficiently guided in an extremely simple manner. Furthermore, the balls arranged between successive blanks will keep these from riding upon one another as the series is pushed through the device.

The embodiment thus far illustrated and described sets forth my invention in its broadest aspect, and I shall now proceed to describe several modifications which may be found suitable under certain circumstances.

In Fig. 5 I have illustrated a modification wherein blades of the double-edged type may be guided. In this embodiment, the superposed elements 16' and 17' are of a width to permit the blade to project therefrom from both sides. In this manner, both edges of the blade may be suitably treated during their passage through the guiding mechanism.

In Figs. 6 and 7 I have illustrated the employment of a belt for effecting the movement of the blanks. In Fig. 6 the blade receiving channel has been enlarged to accommodate a belt 30, and this belt is provided with a series of openings therein corresponding to the positions which the balls of Fig. 1 are made to assume. In this embodiment, the balls will accommodate themselves within the belt openings, and if the belt is moved longitudinally, the blades will move with it in a manner which will be readily understood.

In the embodiment of Fig. 6, the contact between the balls and the guideway provided in the element 31 will be a sliding contact. In Fig. 7, I have illustrated a modification wherein this contact may be made to be a rolling contact. I have illustratively shown a belt 32 spaced from the blades at substantially the distance which the bottom of the groove 19 is spaced therefrom in Fig. 1. The belt is in this case not provided with any openings, but is designed to move the balls by frequently engaging therewith and causing them to roll in a reverse direction. In other words, the belt 32, if moved longitudinally, will cause the blades to move in the same direction at approximately half the speed of the belt.

In both of the embodiments of Figs. 6 and 7, and in the embodiments presently to be described, the elements 16 and 17, or the elements corresponding thereto, are suitably constructed to accommodate the modified or additional elements described.

In Figs. 8 and 9, I have shown a modification similar to that of Fig. 7, wherein the guiding means comprise cylindrical rollers 33. By the employment of such guiding rollers, only one opening need be provided in each blade, the pivoting of the blade being effectually prevented by the rectangular engagement of the roller. In this embodiment, a belt 34 has been provided which is designed to operate substantially like the belt 32 of Fig. 7. And in this embodiment, the guideway provided in the element 35 (corresponding to the element 17) will comprise a rectangular channel instead of a semi-circular channel or groove.

In all of the embodiments hereinbefore described, the contemplation of a grinding wheel as one of the operating instrumentalities has necessitated the proper shaping of the element 16 so as to permit the supporting device to be positioned sufficiently close to the wheel. Thus, in Figs. 2 and 3, it will be observed that the forward under-edge of the element 16 has been beveled off to provide a slanting surface 36. A similar construction is shown in Fig. 6. With a view to further accounting for this factor, the modification of Figs. 10-13 provides suitable recesses 37 and 38 in the supporting elements 39 and 40 respectively for the accommodation of the grinding wheels.

More particularly, the recess 37 is designed to accommodate a grinding wheel 41 positioned to operate upon the upper surface of the blades; and the recess 38 is positioned and designed to accommodate a grinding wheel 42 whose purpose it is to operate upon the under-surface of the blades. The grinding wheels 41 and 42 are longitudinally spaced from each other, the wheels acting in succession upon the blades as the latter are pushed through the device. For the purpose of permitting these recesses 37 and 38 to be provided without impairing the operation of the guide means within a guideway, the guide means are in this embodiment provided in the form of cylindrical elements 43 arranged transversely to the blades. The guideway is in this embodiment a rectangular one, similar to that of Fig. 9, and the engagement of the elements 43 therein is a sliding one. The guideway is made to undulate in accordance with the provision of recesses 37 and 38, thereby forming a cam surface which forces the elements 43 first in one direction and then in the other. More particularly, the elements 43 reciprocate longitudinally with respect to themselves within their respective openings or spaces. This reciprocation does not affect the firmness with which the blades are engaged, but it does permit the recesses 37 and 38 to be provided in a manner which will otherwise cut into the guideway in which the elements 43 move.

Although I have illustrated and described my invention as applied to the treatment of cut blanks, nevertheless it will be obvious that a continuous strip may be employed if desired. In such a case, the strip would be preferably provided with spaced openings so that it would be efficiently supported and guided at spaced intervals along its length. It will also be obvious that the particular driving mechanism may be varied at will depending upon requirements, and that as to certain phases of my invention the employment of any particular type of belt, roller, or guideway, may not be essential. It will also be obvious that many changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a blade conducting device, a holder comprising complementary sections having configurations to provide a guideway and a strip-receiving passage therebetween, and means constrained to move in said guideway and adapted to engage a strip, said means comprising a plurality of rollers free to roll through said guideway.

2. In a device of the character described, a holder having a strip-receiving slot and a guideway coincident therewith, means for feeding a plurality of apertured blade strips successively into the slot to position the apertures in said guideway, a plurality of mutually disconnected guiding elements, and means for successively feeding said elements into said guideway and into the apertures of said strips.

3. In a device of the character described, a holder having a strip-receiving slot and a guideway coincident therewith, means for feeding a plurality of apertured blade strips successively into the slot to position the apertures in said guideway, means for moving said strips through the slot, a plurality of mutually disconnected guiding elements, and means for feeding said elements successively into the guideway and into the apertures of successive strips and into the spaces between said strips, whereby the latter will be spaced and guided throughout their movement.

4. In a blade conducting device, a holder having a guideway and a slot communicating therewith and adapted to receive a blade strip, means constrained to move in said guideway and engaging the strip, whereby a predetermined guided movement through said slot may be imparted to the strip, and means for varying the transverse disposition of said engaging means in said guideway during the movement.

5. In a blade conducting device, a holder having a guideway and provided with means for movably receiving a blade strip, means constrained to move in said guideway and engaging the strip, whereby a predetermined guided movement with respect to the holder may be imparted to the strip, and means for varying the transverse disposition of said engaging means in said guideway during the movement, said last named means comprising cam portions associated with said guideway.

6. In a blade conducting device, a holder having a guideway provided with cam portions, and being also provided with means for movably receiving a blade strip, and means constrained to move in said guideway and engaging said strip, whereby a predetermined guided movement may be imparted to the strip, and whereby the transverse disposition of said engaging means in said guideway will be altered during the movement by virtue of said cam portions, said last named means comprising a plurality of mutually disconnected elements movable in said guideway and adapted to encounter said cam portions to be guided thereby.

7. In a blade conducting device, a holder having a guideway provided with cam portions, said holder being also provided with means for movably receiving an apertured blade strip, and means constrained to move in said guideway, said means being adapted to encounter said cam portions and to engage within said apertures, whereby a predetermined guided movement may be imparted to the strip, and whereby the transverse disposition of said engaging means in said guideway will be variable by virtue of the cam portions.

8. In a blade conducting device, a holder having recesses to accommodate portions of operating instrumentalities, said holder being also provided with means for movably receiving a blade strip in a manner which will present an edge of said strip to said instrumentalities, guiding means for said strip, and said holder being provided with a guideway for said last named means, said guideway being arranged and constructed to variably position said guiding means so as to clear said recesses.

9. In a blade conducting device, a holder having recesses to accommodate portions of operating instrumentalities, said holder being also provided with means for movably receiving a blade strip in a manner which will present an edge of said strip to said instrumentalities, guiding means for said strip, and said holder being provided with a sinuous guideway for said last named means, said guideway having a configuration which avoids said recesses.

10. In a blade conducting device, a holder having recesses to accommodate portions of operating instrumentalities, said holder being also provided with means for movably receiving a blade strip in a manner which will present an edge of said strip to said instrumentalities, guiding means for said strip, said holder being provided with a guideway for said last named means, said guideway having a sinuous configuration which avoids said recesses, and said guiding means being of a character to engage the strip in various transverse dispositions of said guiding means in said guideway, whereby said transverse disposition will vary by virtue of said guideway configuration.

11. In a blade conducting device, a holder provided with a blade strip-receiving slot and a guideway coincident therewith, said holder having recesses to accommodate juxtaposed grinding wheels and said slot being arranged to present opposite sides of an edge of a blade strip successively to said wheels, means in said guideway for moving the strip, and means for shifting said moving means transversely in said guideway to clear said recesses.

12. In a blade conducting device, a holder provided with a blade-strip-receiving slot and a guideway coincident therewith, said holder having recesses to accommodate juxtaposed grinding wheels and said slot being arranged to present opposite sides of an edge of a blade strip successively to said wheels, a plurality of mutually disconnected elements in said guideway and adapted to engage said strip, and means for shifting said elements transversely in a manner which will cause them to clear said recesses.

13. In a blade conducting device, a holder having a sinuous guideway and a non-sinuous slot communicating therewith, said slot being adapted to receive a blade strip for sliding movement therein, and means constrained to move in said guideway and engaging the strip, whereby a guided movement through said slot will be imparted to the strip, and whereby the transverse disposition of said engaging means relative to said slot will be varied during such movement.

In witness whereof, I have signed this specification.

GODFREY DALKOWITZ.